May 28, 1929.　　　J. G. McDONOUGH　　　1,715,167
LUMBER GRADE MARKING MACHINE
Filed Aug. 15, 1923　　　10 Sheets-Sheet 1

INVENTOR
JOSEPH G. McDONOUGH
ATTORNEYS

May 28, 1929.　　　J. G. McDONOUGH　　　1,715,167
LUMBER GRADE MARKING MACHINE
Filed Aug. 15, 1923　　10 Sheets-Sheet 4

INVENTOR
JOSEPH G. McDONOUGH
ATTORNEYS

May 28, 1929.   J. G. McDONOUGH   1,715,167
LUMBER GRADE MARKING MACHINE
Filed Aug. 15, 1923   10 Sheets-Sheet 6

INVENTOR
JOSEPH G. McDONOUGH
By Paul, Paul & Moore
ATTORNEYS

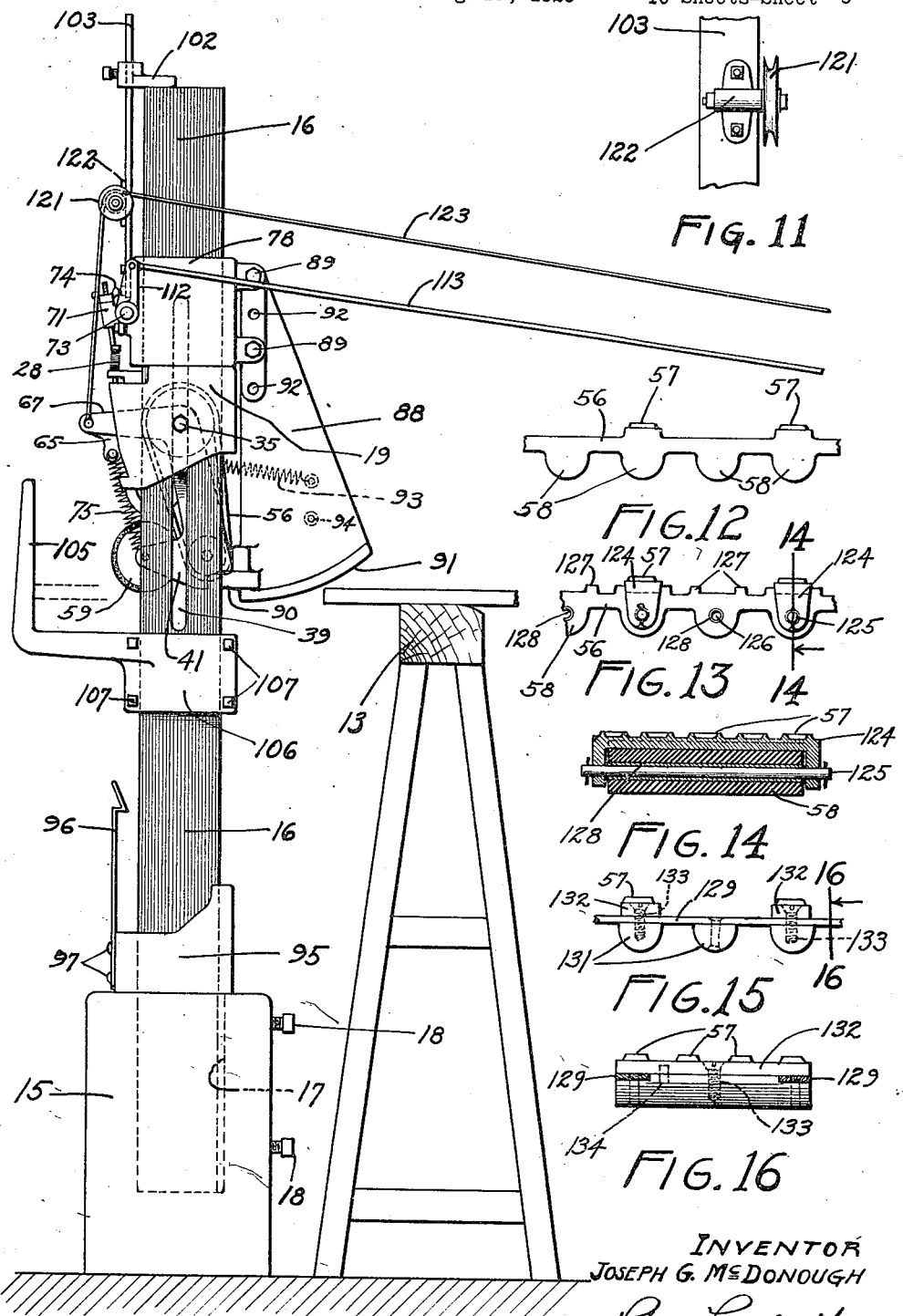

May 28, 1929.    J. G. McDONOUGH    1,715,167
LUMBER GRADE MARKING MACHINE
Filed Aug. 15, 1923    10 Sheets-Sheet 10

INVENTOR
JOSEPH G. McDONOUGH
By Paul, Paul & Moore
ATTORNEYS

Patented May 28, 1929.

1,715,167

UNITED STATES PATENT OFFICE.

JOSEPH GILBERT McDONOUGH, OF NEW ORLEANS, LOUISIANA.

LUMBER-GRADE-MARKING MACHINE.

Application filed August 15, 1923. Serial No. 657,519.

This invention relates to new and useful improvements in marking machines designed particularly for use in grade marking lumber of different or duplicate dimensions received from planers, matchers, bins, wagons, transfer or assorting chains.

The principal object of the invention is to provide a marking machine particularly adapted for use in marking, for identification, dressed or rough lumber of small or large dimensions, as the lumber is placed upon or received from a grading or transfer table or in or moving to or from a bundling rack, preparatory to being tied into bundles in the usual way before being placed in storage or transit.

A further object of the invention is to provide a marking machine adapted to be actuated by each board as it is thrust or fed into or past the machine.

A further object is to provide a marking machine having means for automatically positioning the apparatus, to receive each board, as it is placed upon the preceding board during the process of bundling, or loading.

A further object is to provide a marking machine having a plurality of marking dies adjustably and detachably mounted thereon, and, also means for automatically inking such dies during each operation of the apparatus.

A still further object is to provide a marking machine which may be readily and easily adapted for either end marking or surface marking the end or forward portions of a board as desired.

Other objects of the invention will more fully appear from the following detailed description and the accompanying drawings, and will be particularly pointed out in the annexed claims.

In the drawings there has been disclosed a structure designed to carry out the objects of the invention, but it is to be understood that the invention is not confined to the exact features shown, especially to marking top and end surfaces as the bottom surfaces and surfaces nearer the operator may be selectively marked by slightly modifying the machine.

In the drawings:

Figure 10 is a view in side elevation of the apparatus, looking at it from the side opposite of that shown in Figures 8 and 9, showing the stop provided to arrest the movement of the board after being marked, and also the means provided for releasing the main carriage from the upright supporting bar when it is desired to lower the apparatus after completing a bundle;

Figure 11 is a detail view showing the means for supporting the sheave for the lowering cable;

Figure 12 is an enlarged detail view of a portion of the flexible die belt to show the construction thereof;

Figure 13 is a modification of Figure 12, showing a die belt having the marking dies detachably mounted thereon;

Figure 14 is a transverse sectional view on the line 14—14 of Figure 13, showing the method of securing the dies to the belt;

Figure 15 is another modification of Figure 12, showing a construction in which the belt is composed of two flexible metal bands connected together by a plurality of spaced transverse teeth to which the marking dies are detachably mounted;

Figure 16 is a cross sectional view on the line 16—16 of Figure 15, showing how the dies are secured to the transverse teeth of the belt.

Figure 1:
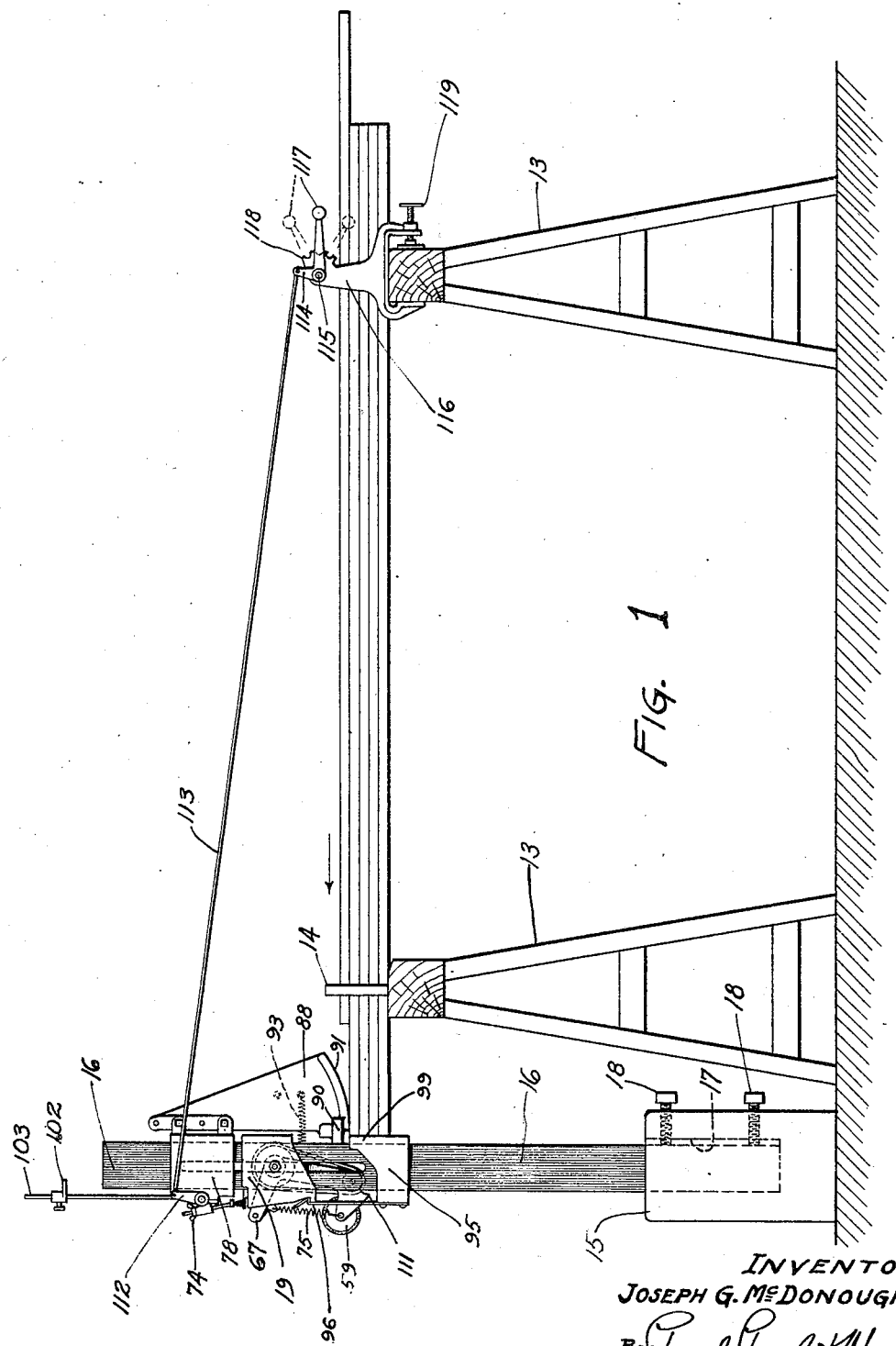
Figure 1 is a view in side elevation of a marking machine embodying my invention and adapted to end mark the forward portion of lumber placed in a bundling rack.

In the selected embodiment of the invention here shown, for purpose of disclosure, there is illustrated a bundling rack, of the usual type, comprising two wooden standards 13, provided with a plurality of stakes or pins 14, between which the boards are placed preparatory to being marked. After the boards have been marked they may be tied into bundles in the usual way, if desired, before being removed from the rack. A suitable base block 15, preferably of cast metal, is provided adjacent one end of the bundling rack, and its function is to provide a suitable anchoring means for the upright supporting bar 16 of the apparatus. I have here shown the bar 16 inserted into a pocket 17 provided in the base block and securely held therein by set screws 18, received in threaded engagement in the wall of the block 15.

This novel device consists chiefly of two slidably mounted carriages, namely, a main carriage, upon which the marking mechanism is mounted, and a raising carriage which functions in raising and automatically positioning the entire apparatus to receive each board.

Figure 5:
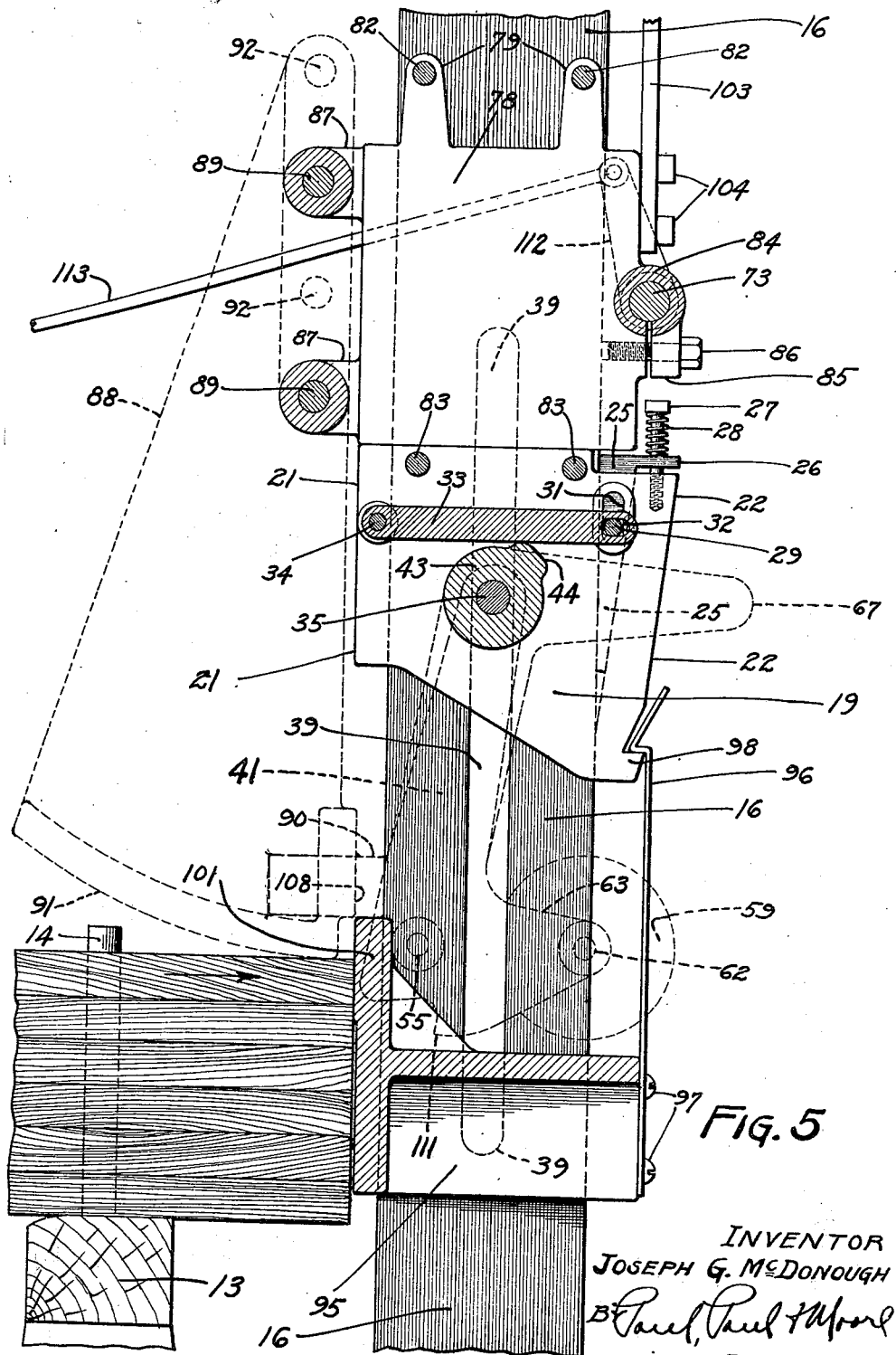
Figure 5 is a vertical sectional view on the line 5—5 of Figure 4 showing the means provided for releasing the main carriage from the upright supporting bar, and, also the means provided to arrest the movement of the board after it has been marked.
Figure 6:
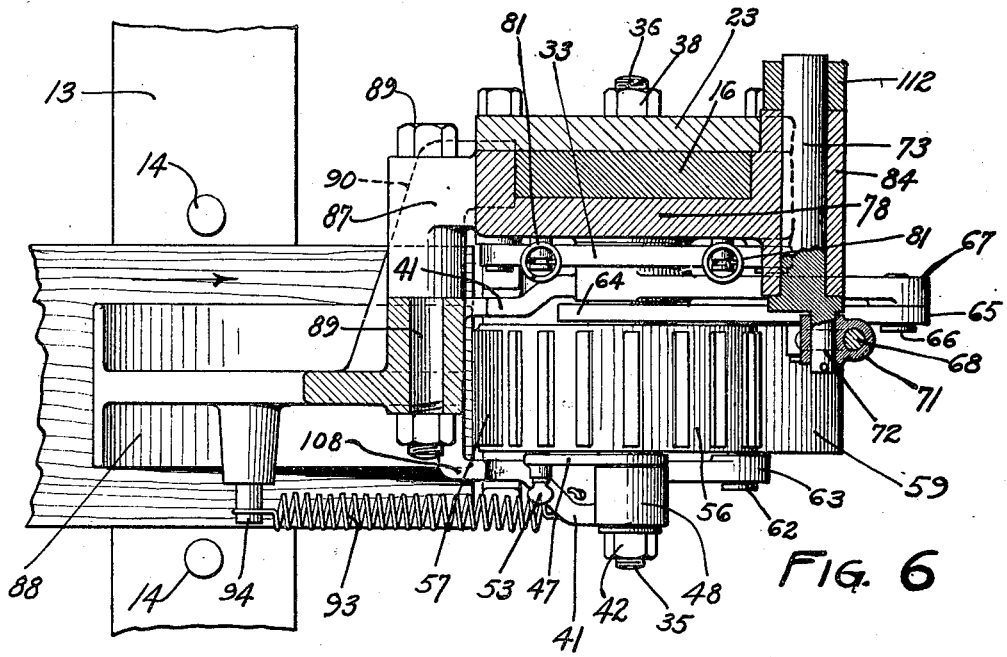
Figure 6 is a horizontal sectional view on the line 6—6 of Figure 2 showing the means provided for shifting the dies.
Figure 7:
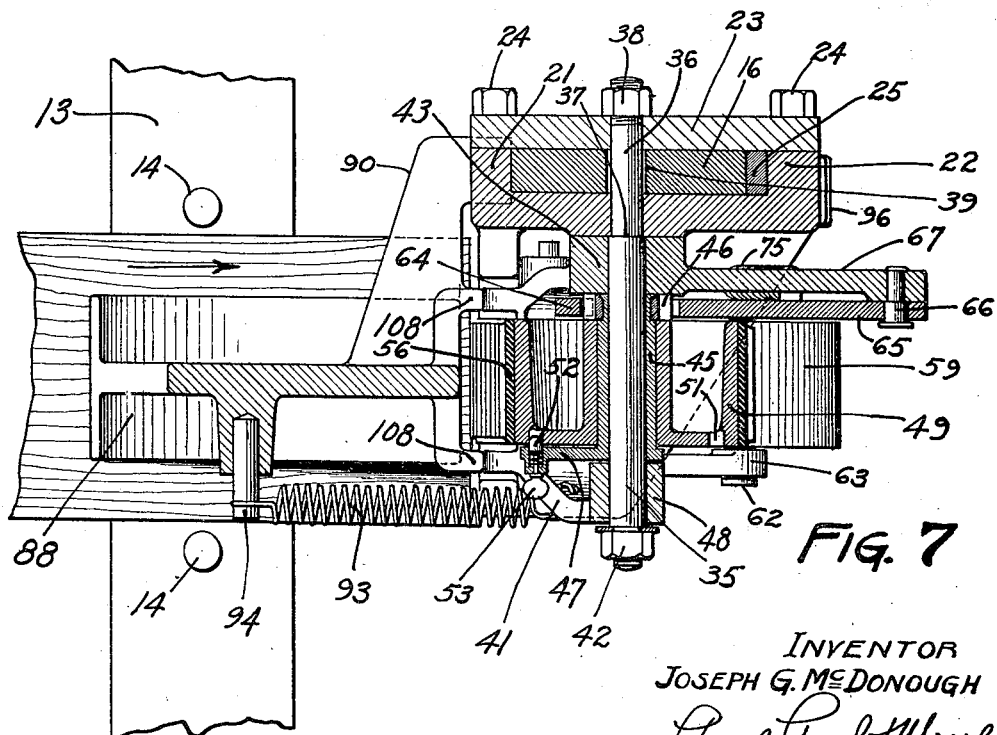
Figure 7 is a horizontal sectional view on the line 7—7 of Figure 2 showing the means provided for adjusting the die belt to change the dies.

The main carriage 19, preferably of cast metal, is provided on one side with a flange 21 adapted to engage the edge of the bar 16, the other side of the carriage being provided with a similar flange 22 preferably integral therewith, to which a metallic plate 23 is secured by screws 24, thus providing a suitable bearing to receive the bar 16, (Figures 6 and 7). Referring to Figure 5, it will be noted that the inner face of the flange 22 is on a slight angle or bevel with reference to the edge of the bar 16, adapted to receive the correspondingly inclined surface of a suitable wedge 25. This wedge is provided with a lug 26 apertured to loosely receive a screw 27 secured to the upper face of the flange 22. A suitable compression spring 28 is interposed between the lug 26 and the head of the screw 27, its function being to seat the wedge and clamp or lock the carriage to the upright supporting bar 16 in position to receive the succeeding board. The wedge 25 is provided with a pin 29, secured thereto and projecting outwardly therefrom through a clearance slot 31 provided in the wall of the main carriage 19. The terminal end of this pin is received and engaged by an elongated aperture 32, provided in the terminal end of a releasing arm 33, pivotally connected to the main carriage by a headed screw 34.

A main pivot pin 35, having a reduced end portion 36, has one end secured to the main carriage by means of the shoulder 37, provided on the pin, and a nut 38 received in threaded engagement with the end portion 36 of the pin 35, (Figure 7). An elongated aperture 39 is provided in the supporting bar 16 to provide clearance for the end portion 36 of the pin 35, in the up and down movement of the carriage upon the bar.

A yoke 41, preferably of cast metal, is pivotally mounted upon the pin 35, and retained thereon by a nut 42. The inner bearing hub 43 of this yoke is preferably provided with a suitable cam 44, adapted to engage the arm 33, upon movement of the yoke 41, thereby, releasing the wedge 25 from its seat and unlocking the main carriage from the bar 16. A sleeve 45 is rotatably mounted upon the pin 35 and has a pinion 46 rigidly secured to its inner end, adjacent the bearing hub 43, while an adjusting arm 47, preferably integral therewith, is provided on the other end of the sleeve, adjacent the outer bearing 48, of the yoke 41. A toothed wheel 49, preferably of cast metal, is rotatably mounted upon the sleeve 45 between the pinion 46 and the adjusting arm 47. The outer face of this wheel is provided with a plurality of apertures 51 adapted to receive a spring bolt 52 provided in the terminal end of the arm 47.

Figure 2:
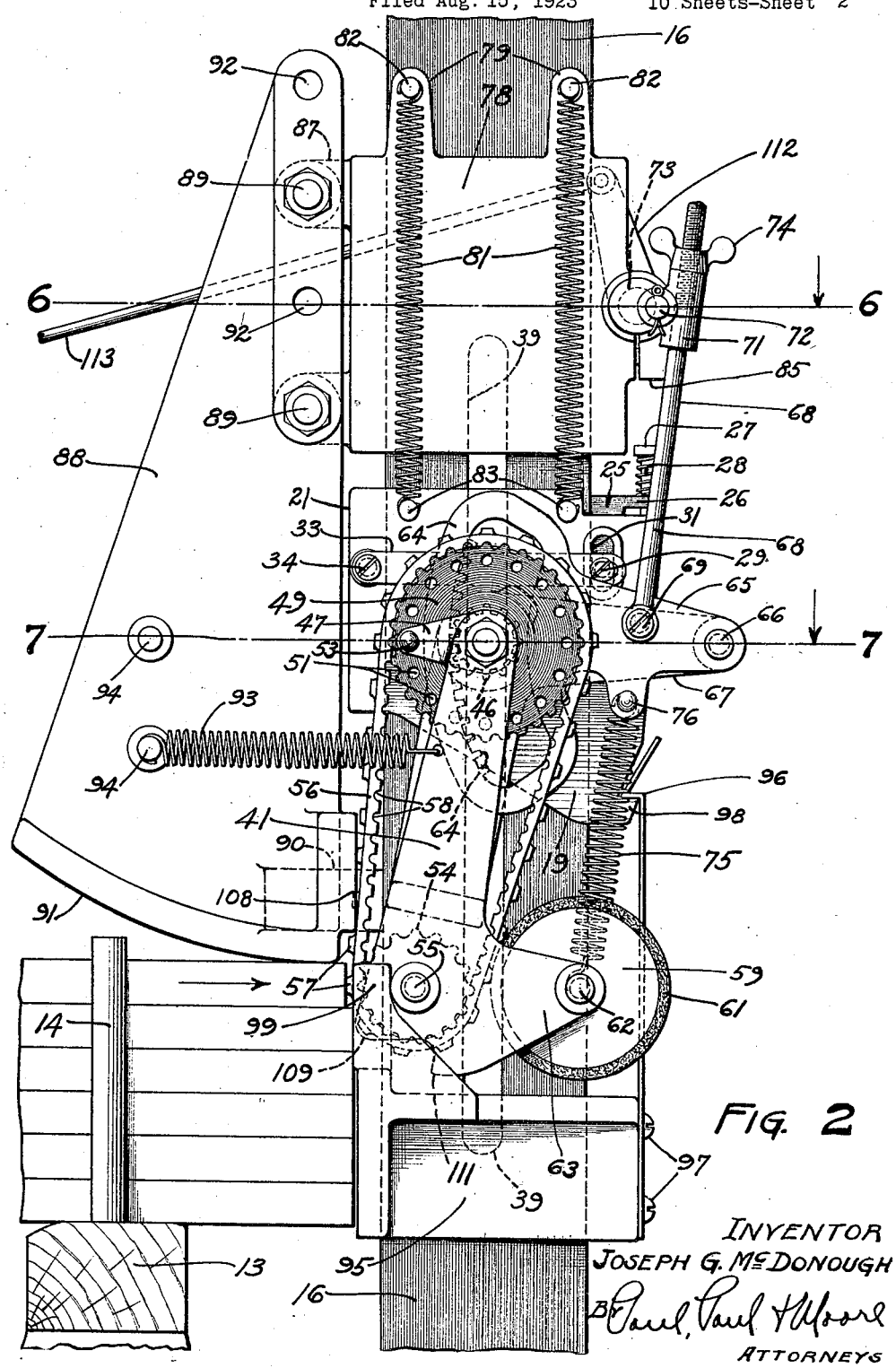
Figure 2 is a side elevation of the apparatus showing a board in position to be marked, and also the means for inking the dies.
Figure 8:
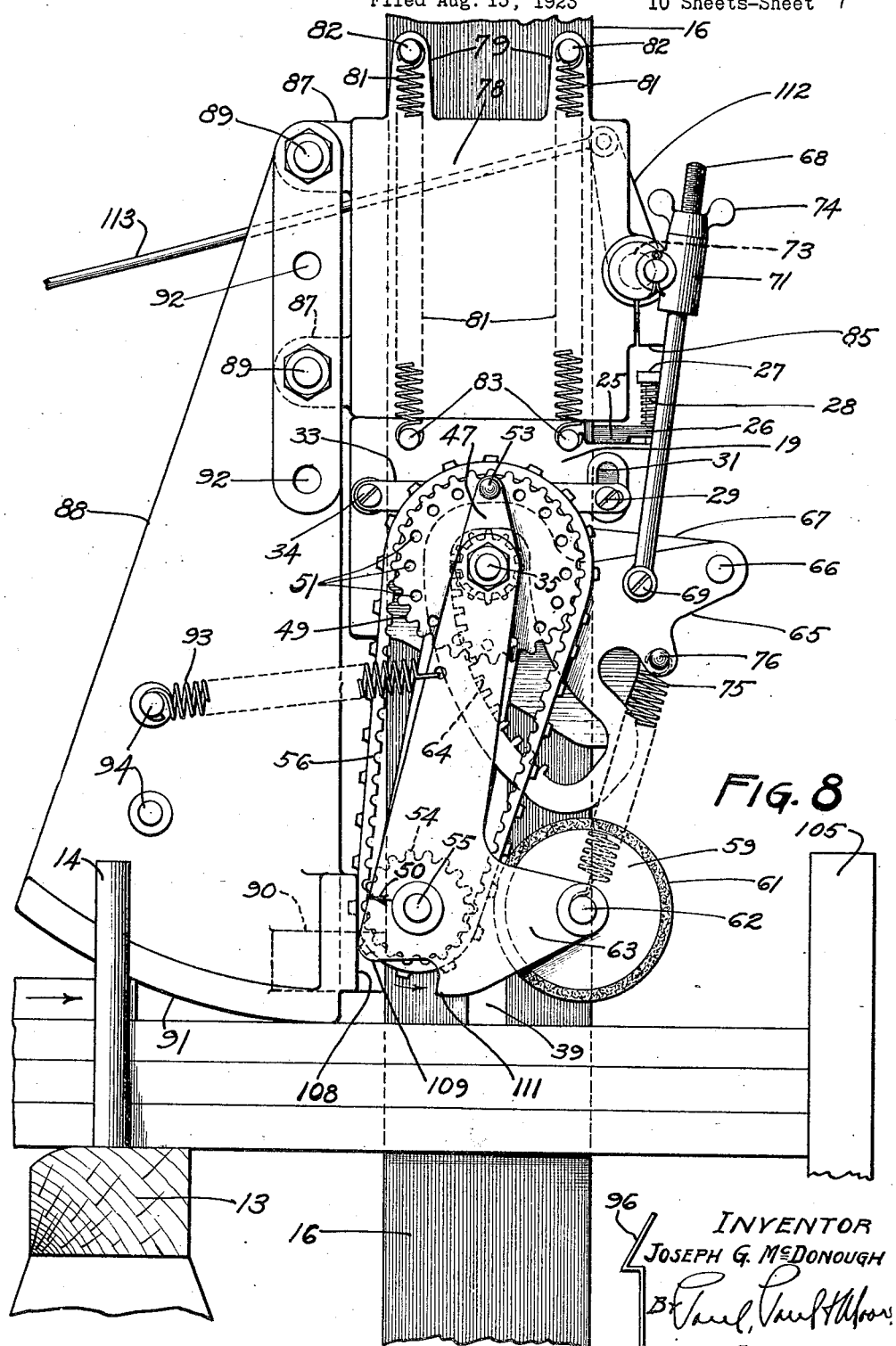
Figure 8 is a view similar to Figure 2, showing the apparatus adapted for surface or face marking.
Figure 9:
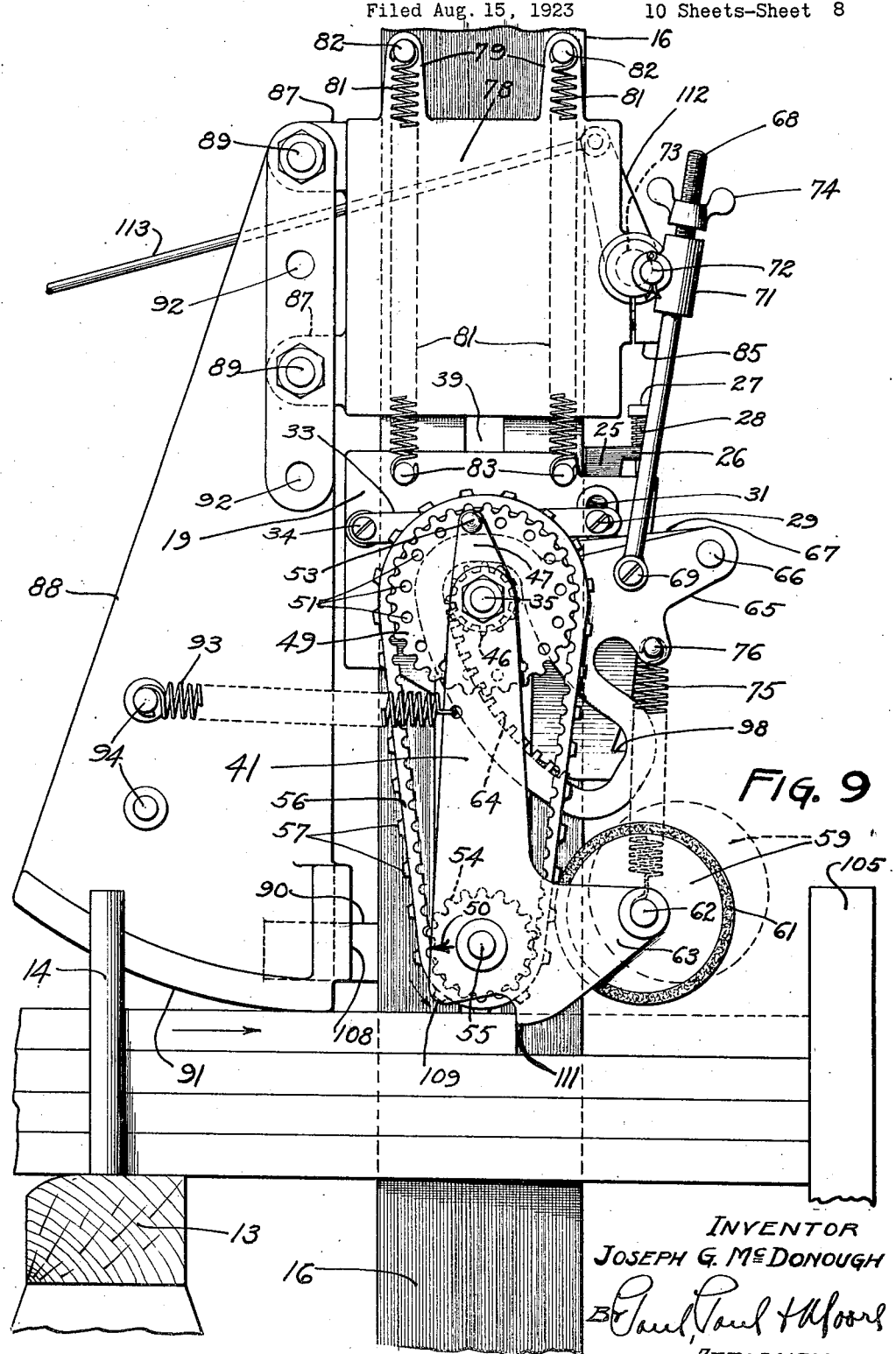
Figure 9 is a view similar to Figure 8, showing a forward or end portion of a board being face or surface marked, and also the means provided to prevent more than one die from engaging the board at each operation of the machine.

An endless flexible die belt 56, preferably of rubber, is mounted upon the wheels 49 and 54, as clearly shown in Figures 2, 3, 8 and 9. The outer surface or side of the belt is provided with a plurality of suitable marking dies 57, preferably integrally formed therewith, as shown in Figure 12, adapted to engage either the end or the face of the board, as shown in Figures 2 and 9. The inner side of the belt is provided with a plurality of transverse teeth 58, preferably integral therewith, spaced to receive the teeth provided on the peripheries of the wheels 49 and 54 to prevent slippage thereon. If desired, the belt may be composed of links with detachable or separable sections, or, it may be constructed with detachable marking dies, as shown in Figures 13 to 16, inclusive, which figures will be subsequently described. Thus, when it is desired to mark a batch of lumber, the spring bolt 52 is withdrawn from the aperture 51 by means of the finger grip 53, thereby releasing the wheel 49 from the arm 47. The operator then revolves the wheel 49 upon its axis until the desired die 57 is brought into registration with a suitable pointer 50, preferably provided on the outer lower portion of the yoke, and on substantially a horizontal line with the axis of the pin 55 when the apparatus is positioned, as shown in Figure 2. The spring bolt 52 is then released, entering one of the apertures 51 and securely locking the wheel 49 to the arm 47 of the sleeve 45, thereby preventing the belt from changing its position relative to its starting position during the operation of the apparatus.

Means are also provided for inking the dies at each operation of the apparatus, thus, insuring a clear and distinct marking on each board. An inking roll 59, covered with the usual facing 61, is removably and rotatably mounted on a pin 62 supported by a pair of lugs 63, preferably integral with the lower portion of the yoke 41. The inking roll is arranged in such a manner as to be rotated by frictional contact with the face of the marking dies 57 when the belt is revolved, due to rotation of the wheel 49.

A suitable rack 64, preferably curved, having an arm 65, is pivotally connected by a pin 66, to the terminal end of an arm 67, preferably integral with the hub 43 and the inner arm of the yoke 41, adapted to engage the pinion 46 secured to the sleeve 45. A connecting rod 68 has its lower end pivotally connected to the arm 65 by a pin 69. The upper end of the rod passes through a suitable bearing 71, pivotally mounted upon a crank pin 72 provided on the end of a short crank shaft 73. This end of the connecting rod is also threaded to receive a wing nut 74 adapted to bear against the upper face of the bearing 71 for the purpose of limiting the downward movement of the rack 64, when the yoke 41 is in the position shown in Figure 2. A coiled tension spring 75 is provided to yieldably hold the rack 64 in its downward position. The lower end of the spring is attached to the inner end of the pin 62, upon which the inking roll is mounted, and its upper end is secured to a pin 76, provided in the arm 65 of the rack 64. The function of the above described mechanism is to rotate the wheel 49, by means of the intermediary sleeve 45 and arm 47, thereby revolving the belt upon the wheels 49 and 54 sufficiently to bring the die being used into engagement with the face of the inking rolls 59, thus, automatically inking the die each time the yoke 41 is actuated by a board. The wing nut 74 also provides a practical means for adjusting the dies with reference to the end or face of the board.

Means are provided for raising or elevating the main carriage for each successive board. For this purpose a slide or carriage 78 is provided, and is slidably mounted upon the supporting bar 16, directly above the main carriage 19. Two lugs 79 are preferably provided upon the upper portion of this carriage, to which a pair of coiled tension springs 81 are connected by pins 82. The lower ends of the springs are connected to the upper portion of the main carriage by means of the pins 83, secured thereto. A bearing 84 is preferably provided on one side of the carriage 78 to provide a suitable support for the crank shaft 73, as shown in Figure 6. This bearing is preferably split on one side and provided with a suitable lug 85, apertured to receive a cap screw 86, the end of which is received in threaded engagement in the side of the carriage 78. Thus, the crank shaft 73 may be locked in any desired position by tightening the screw 86, against the lug 85.

A pair of lugs 87, preferably integral therewith, are provided on the side of the carriage opposite from the side upon which the bearing 84 is located. A raising member 88 is secured to the lugs 87 by suitable bolts 89. The lower surface 91 of this member is preferably formed, as indicated in Figures 2, 4, 8 and 9, so that when a board is pushed into the apparatus to be marked, it will engage the surface 91, as shown in Figure 8, and raise such member and the carriage 78, to which it is secured, to the position shown in Figures 2 and 9, as the board continues in its forward or feeding movement to the die. As soon as the end of the board contacts with the marking die, as shown in Figure 2, the resultant force or pressure from the impact or movement of the board, will cause the yoke 41 to move forwardly to the position shown in Figure 3, thereby unlocking the main carriage from the bar 16 and permitting it to be raised by the springs 81, to the position shown in Figure 8, or until its upper surface contacts with the bottom surface of the carriage 78. The upper portion of this member is provided with apertures 92, whereby said member may be adjusted from the position shown in Figures 2 and 3, to the position shown in Figures 8 and 9, the latter being the position required for surface or face marking. A tension spring 93 is provided to retain the yoke 41 in its normal position. One end of this spring is connected to the outer arm of the yoke 41 while the other end is connected to the raising member 88 by means of suitable pins 94, secured thereto. A transversely extending integral arm 90 is provided on the lower portion of the raising member 88, and adapted to engage the edge of the bar 16 to provide a suitable brace or support for the member 88 when engaged by a board, shown in Figures 6 and 7.

Figure 3:
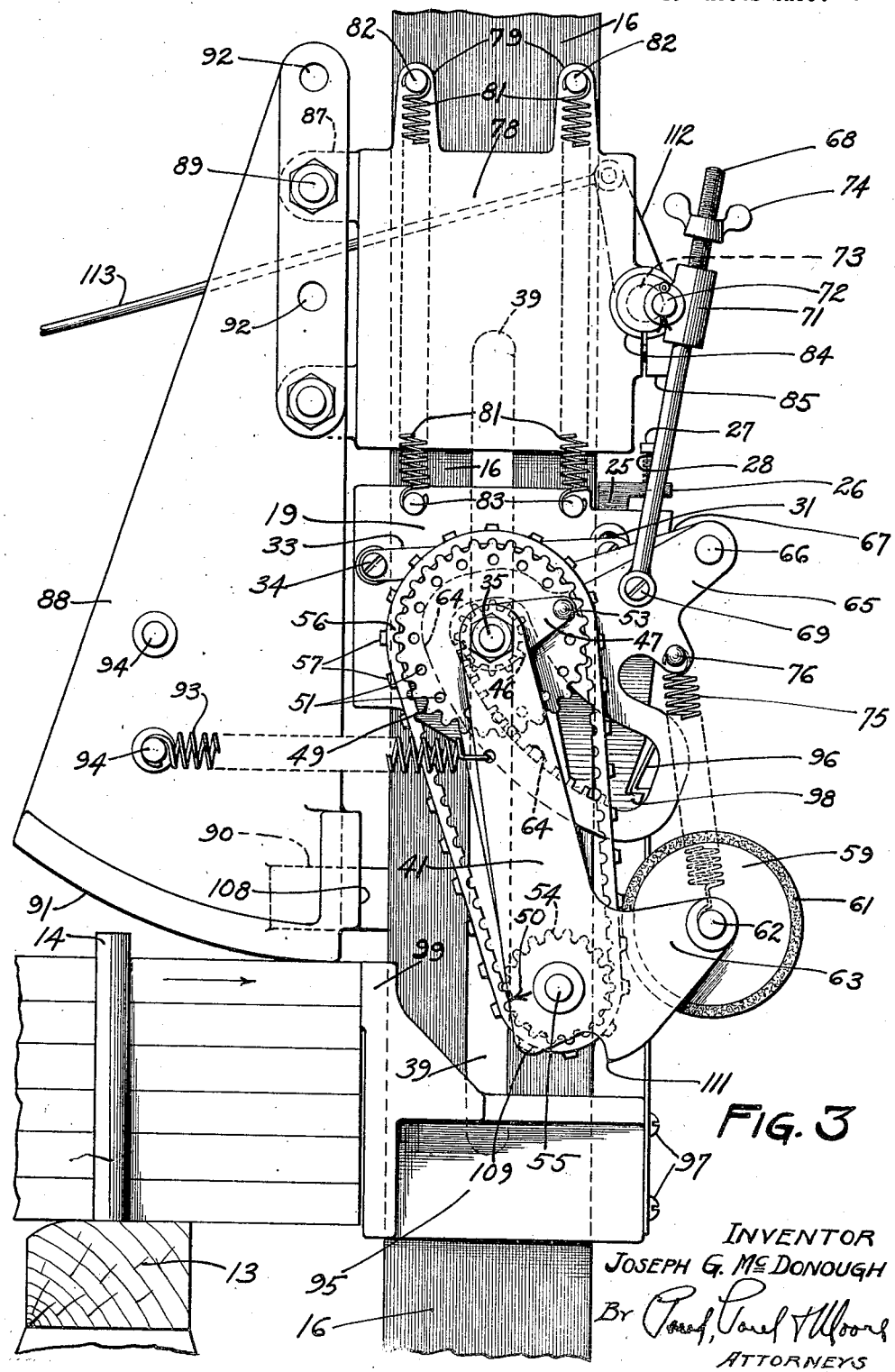
Figure 3 is a view similar to Figure 2, showing the relative position of the parts after the board has been marked and also showing the means provided for adjusting the dies with reference to the end or a surface of the board.
Figure 4:
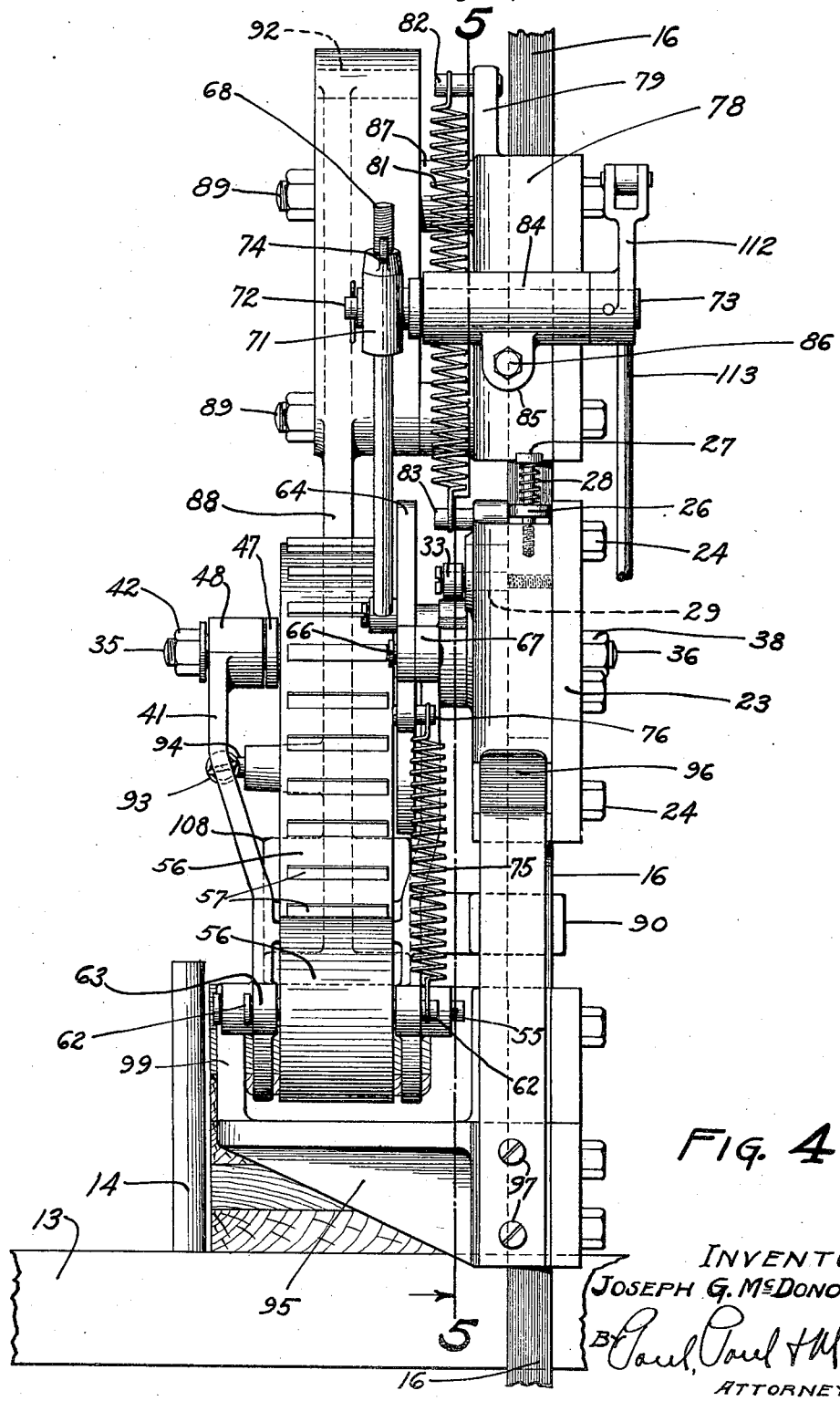
Figure 4 is a rear elevation of the apparatus.

Means are also provided for arresting the movement of the board after it has been marked, and consists of a slide 95 slidably mounted upon the bar 16 directly beneath the main carriage 19. This slide is preferably supported on the main carriage by a suitable hook 96, having its lower end secured to the slide by suitable means, such as screws 97, and having its upper end adapted to engage a lug 98 provided in the lower portion of the main carriage, as clearly shown in Figure 5. A stop lug 99 is provided on the side of the slide adjacent the raising member 88, adapted to cooperate with a similar lug 101 in arresting the movement of the board after it has been marked by engagement with the marking die, as indicated in Figure 3. The lugs 99 and 101 also function in providing a suitable stop for the yoke 41 when in normal position, (Figure 2), being held against said lugs by the spring 93.

A stop lug 102, preferably secured to the raising carriage 78 by screws 104, is adjustably mounted upon an upright bar 103 and functions to provide a suitable stop for limiting the downward movement of the apparatus upon the bar 16, (Figures 1, 5 and 10). Obviously, the normal or starting position of the apparatus upon the bar 16 must be in a fixed relation with reference to the top face of the bundling rack so as to bring the desired marking die in alignment with the end of the first board placed upon the rack.

In Figures 8, 9 and 10, the apparatus is shown as adapted for surface or face marking. It frequently happens that a certain lot of lumber will have ends so rough and uneven that it cannot be satisfactorily marked on the ends. To overcome this difficulty it becomes necessary to mark the boards upon the surface or face thereof, instead of on the ends, as above described, and means are therefore provided, whereby the apparatus, by a slight adjustment, may be adapted to mark the boards on the top surface as they are pushed or fed into the apparatus.

To make this adjustment the stop slide 95 is dispensed with, by releasing the hook 96 from the main carriage 19, thereby permitting it to be lowered out of the way, as shown in Figure 10. A similar stop 105 is then substituted, preferably terminating in a rectangular block 106 rigidly secured to the supporting bar 16 by suitable screws 107. The raising member 88 is then adjusted or lowered from the position shown in Figures 2 and 3, to the position shown in Figures 8 and 9, and the end of the spring 93 is released from the lower pin 94 and secured to the upper pin represented by a like numeral.

Upright lugs or flanges 108, preferably integrally formed with the lower portion of the raising member 88, are adapted to engage the rounded ends 109 provided on the lower portion of the yoke 41, when the yoke is in its normal position as shown in Figure 8. A pair of depending lugs 111, preferably integral therewith are provided on the lower portion of the yoke, adapted to engage the end of the board, as indicated in Figure 9.

In the practical operation of this novel lumber grade marking machine, it may be desirable to provide means whereby the marking dies may be quickly and readily detached from the die belt for replacement, or, in case it is desired to change the dies for the purpose of changing the grade marks or character on the die belt. Such means are shown in Figures 13, 14, 15 and 16, which figures show modified constructions of the die belt and marking dies.

In Figures 13 and 14, the marking dies 57 are shown as being integrally formed on the outer faces of suitable die blocks 124, secured to the belt 56 by means of pins 125 passing through apertures 126 provided in the transverse teeth 38 of the belt, as shown. Transverse ribs 127 are preferably provided upon the outer surface of the belt to form seats for the die blocks 124, mounted therebetween, as clearly shown in Figure 13. Metal sleeves 128 are preferably provided in the apertures 126 to eliminate wear to the flexible belt, preferably of rubber.

In Figures 15 and 16, there is shown another modification in which the die belt is composed of a pair of flexible metallic bands 129 secured together in spaced parallel relation by the transverse teeth 131 riveted thereto. Die blocks 132, preferably of metal, are detachably secured to the transverse teeth 131, of the belt, by means of screws 133, and a dowel pin 134 is provided in each die blocks 132 to prevent it from relatively changing its position upon the belt.

Figure 17:
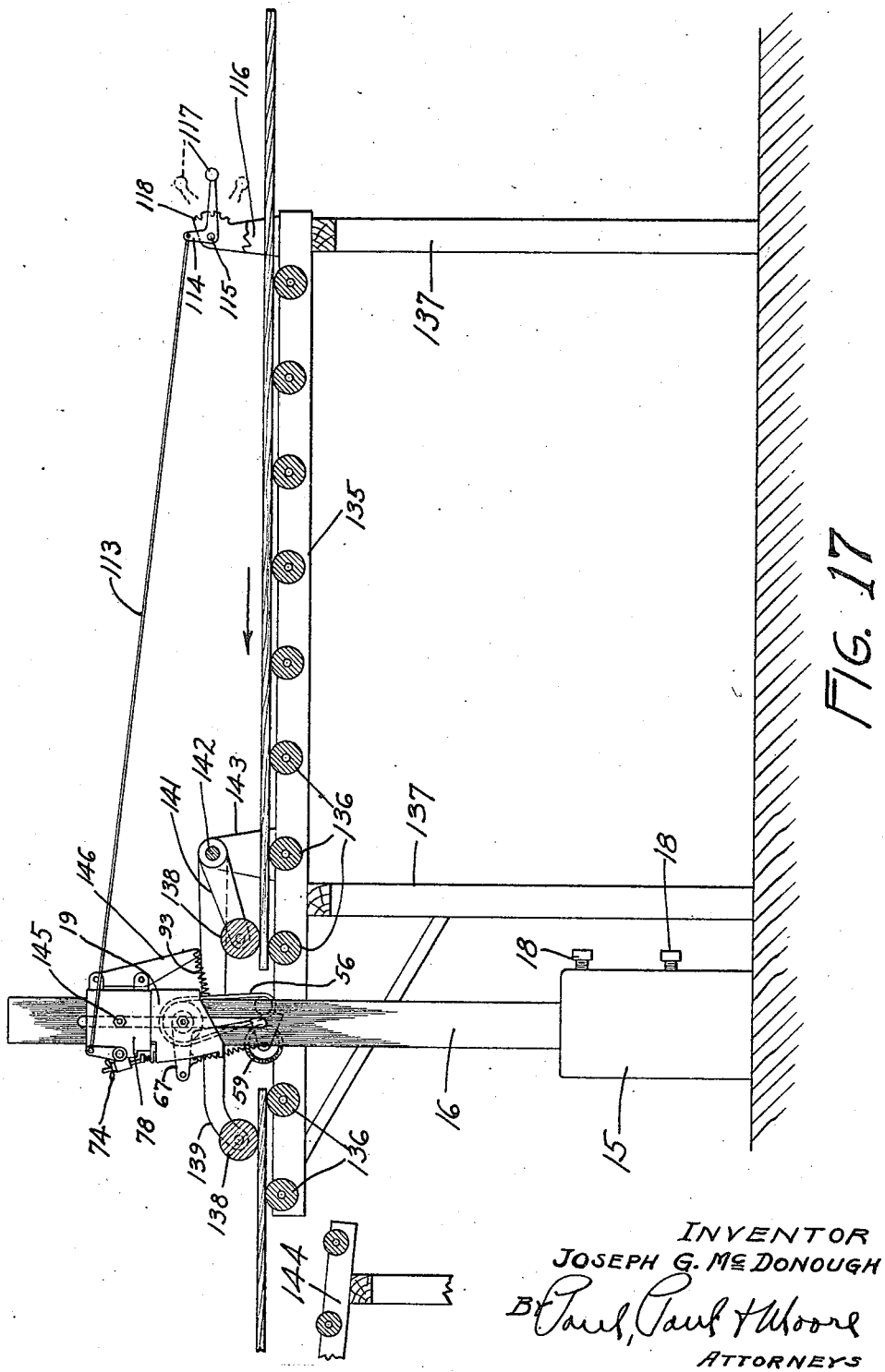
Figure 17 shows a modification of Figure 1, wherein the marking machine is shown adapted for use in conjunction with a power operated feed table.

Figure 17 shows a modification of Figure 1, wherein the marking machine or head is shown adapted for use in conjunction with a power operated feed table 135 instead of the stationary racks 13. The feed table 135 consists preferably of a plurality of power driven feed rolls 136 mounted upon the frame thereof and supported by suitable posts or legs 137. Pressure rolls 138 are rotatably mounted in parallel arms 139 and 141 pivotally mounted upon a shaft 142 supported by brackets 143 suitably secured to the frame of the feed table. The feed rolls 136 may be driven from any suitable source of power, not shown. A suitable receiving table 144 is arranged adjacent the delivery end of the feed table, adapted to receive the marked lumber ejected from the table and marking machine.

When the marking machine is employed to mark lumber in conjunction with a power operated feed table, as above described the upper or raising carriage 78 is fixedly secured to the upright supporting bar 16 preferably by means of a bolt 145. The main carriage 19 supported by the springs 81 holds it against the lower edge of the carriage 78, as shown. The raising member 88 is preferably removed from the carriage 78 and an arm 146 substituted in place thereof to provide a suitable support for the end of the spring 93. The stop slide 95, shown beneath the carriage 19 in Figure 1, is also dispensed with, as the boards are fed through the marker without interruption. The relative position of the die belt 56 may be adjusted by means of the hand grip 117, in a manner similar to that shown in Figure 1.

Operation.

The operation of this apparatus may be explained in the following manner, first, as adapted for end marking, and with reference to Figures 1, 2 and 3.

The operator will first adjust the apparatus to the proper height upon the bar 16 and with reference to the top face of the bundling rack. This is done by raising or lowering the stop lug 102 upon the bar 103 until the lowest point of the surface 91 of the raising member 88 is in a horizontal line with the top face of the bundling rack or means supporting the board. He will then adjust or revolve the die belt 56 upon the wheels 49 and 54 by withdrawing the spring bolt 52 from the aperture 51 in the wheel 47 and revolving said wheel upon the sleeve 45 until the selected die or group of dies will register with the pointer 50 on the yoke. Should the die or properly spaced dies fail to register with the pointer when the spring bolt is released and enters one of the apertures 51, it may be adjusted to perfect registration by slightly raising or lowering the rack 64 by means of the wing nut 74. The operator will then place a board upon the rack, or feeding means to contact with the selected die, as shown in Figure 1, and give it a quick shove forwardly, or it may be moved forwardly by power, as shown in Figure 17. By such movement, the forward end of the board will first engage the bottom surface 91 of the raising member 88, thereby raising the slide 78 and automatically positioning the apparatus to receive the board for marking. The end of the board will then strike the marking die, as shown in Figure 2, with sufficient force to clearly impress or brand the end of said board, the force of the impact also being sufficient to cause the lower portion of the yoke 41 to be swung forwardly upon the pin 35, as indicated in Figure 3, thereby releasing or unlocking the main carriage 19 from the bar 16 and permitting it to be raised by the springs 81, to be positioned for the succeeding board, as hereinbefore stated. The end of the board then engages the stop lugs 99 and 101 and is thereby prevented from further forward movement.

The inking of the marking dies is also effected by the forward movement of the yoke. When the yoke is moved forwardly from the position shown in Figure 2 to that shown in Figure 3, the terminal end of the normally horizontally arm 67, of the yoke swings upwardly, carrying with it the arm 65 of the rack 64. This upward movement of the arm 65 tends to lift the wing nut 74 from the top face of the bearing 71, but due to the action of the tension spring 75, the arm 65 and rack 64 are moved downwardly, with reference to the arm 67, until the top loop of the rack 64 engages the periphery of the pinion 46, and arrests it from further movement. This movement of the rack actuates the pinion 46 and rotates the wheel 49, through the intermediary sleeve 45 and 47, thereby revolving the belt upon the wheels 49 and 54 sufficiently to allow the die being used to contact with the inking roll 59. As soon as the rack assumes the position above described, it will move in a fixed relation with reference to the yoke, and the arm 65 will raise the connecting rod 68 and wing nut 74 as indicated in Figure 3. The yoke and rack will be returned to their normal or starting position by means of the spring 93, and the slide 78 will be supported by the raising member 88 resting upon the top surface of the board, as indicated in this same figure.

In Figures 8, 9 and 10, I have shown the apparatus adapted for face, or surface marking. To make this change the stop lug 105 is substituted for the stop lugs 99 and 101, on the slide 95, and the raising member 88, is lowered, as hereinbefore described. The adjustment of the apparatus, otherwise, is similar to that employed when adjusting said apparatus for end marking.

In this operation, the board is shoved or fed into the apparatus, until it engages the surface 91 of the raising member, thereby raising the slide 78 and positioning the apparatus, as hereinbefore described. As the board continues in its forward movement it will engage the depending hooks 111, provided on the lower portion of the yoke, and carry said yoke forwardly against the tension of the spring 93, as indicated in Figure 9. As soon as the yoke commences this forward movement the die belt will start to revolve upon the wheels 49 and 54, in the direction indicated by the arrow, caused by the pinion 46 being actuated by the rack 64, as described with reference to Figures 1, 2 and 3.

Due to the arcuate movement of the yoke, the selected die will be brought into frictional contact with the surface of the board, the friction being sufficient to arrest the revolution of the belt upon the wheels, and it will then move forwardly in a fixed relation with respect to the yoke and the end of the board. As soon as the yoke passes beyond the center of its movement, the die will begin to release its pressure upon the surface of the board, and when sufficiently released, will complete its revolution, thereby engaging the inking roll 59, in a manner similar to that described with reference to Figures 1, 2 and 3. The following die will be prevented from contacting with the surface of the board by the rounded ends or guards 109, provided adjacent the hooks 111. It is to be understood that the movement of the belt upon the wheels 49 and 54 is so timed as to bring the selected die into contact with the surface of the board at the right instant. The means provided for unlocking the main carriage from the supporting bar 16 must also be actuated in timed relation with the yoke and die belt.

I prefer also to provide means whereby the die belt may be conveniently revolved from the operator's end of the rack for the purpose of changing the dies to correspond to the various grades of lumber which may be found in one lot, thus, enabling the operator to properly mark each board, (Figure 1). An arm 112 is preferably secured to the end of the crank shaft 73 and is connected to a bell crank 114 by means of a connecting rod 113. The bell crank is pivotally mounted upon a pin 115 secured to the upper portion of a bracket 116, and is provided with a hand grip 117 and a latch of usual construction, adapted to engage a suitable notched quadrant 118, here shown as being integrally formed with the bracket 116. The bracket is also adapted to be secured to the rack by suitable means, such as a clamping screw 119.

Thus, should the operator desire to mark a lot of lumber averaging, say for instance, "#2 common", he will adjust the apparatus to the above marking, and whenever a board would be found which should be graded a little higher, as for instance "#1 common", or perhaps a little lower, such as "#3 common", he will manipulate the hand grip 117 to get the desired die in position to engage the board.

Means are also provided whereby the entire apparatus may be lowered to its starting position upon the supporting bar 16. A small sheave 121 is rotatably mounted in a bracket 122 secured to the upright bar 103. A flexible rope or cable 123 has one end secured to the pin 66 on the arm 65, and extends upwardly therefrom and passes over the sheave 121 and back to the operator's end of the rack where it may be secured to the rack by suitable means, not shown. A pull exerted on the cable will release the main carriage from the bar 16, thereby permitting the entire apparatus to be lowered until the lug 102 engages the top of the bar 16 or to starting position.

I claim as my invention:

1. A lumber grade marking machine, comprising a support over which the lumber is moved, a marker against which the lumber is moved longitudinally and adapted to impact with, and mechanism adapted to be operated manually from a grade marking attendant for selectively shifting said marker to present a new mark to the lumber as each piece is fed and mentally graded by the operator regardless of its length or dimension.

2. A lumber grade marking machine, comprising a support over which the lumber is moved, an endless belt marker in the path of the moving lumber, and mechanism adapted to be operated from a distance for shifting said marker to present a new mark to the lumber.

3. A lumber grade marking machine, comprising a support over which the lumber is moved, a marker in the path of the moving lumber and having a series of marks thereon adapted for adjustment successively in the path of the lumber, an oscillating mechanism for shifting said marker, a cable connected with said oscillating mechanism and a lever mounted at a distance for operating said cable.

4. A lumber marking machine, comprising a support over which the lumber is moved, one piece upon another, a marker in the path of the moving lumber mounted to apply a mark to the first piece of lumber presented thereto, and manually operated means for selectively moving said marker to a position to mark a second piece of lumber moving over and in contact with the first piece.

5. A lumber marking machine, comprising a support over which the lumber is moved, one piece above another, a marker mounted to apply a mark to the lower piece of lumber, and means operated by the lumber for raising said marker with the delivery of each successive piece of lumber thereto for successively marking each piece in the pile.

6. A lumber marking machine, comprising a support over which the lumber is moved, one piece upon another, a marker, and means for locking it in its marking position to apply a mark to the first piece of lumber and mechanism for releasing said marker and raising it to another marking position when the marking of the first piece has been completed.

7. A lumber marking machine, comprising a support over which the lumber is moved, one piece upon another, a vertically sliding marker and means for normally locking it in its marking position, and mechanism actuated by the moving piece of lumber for releasing said marker and allowing it to move to its successive marking positions when the marking of each piece is complete.

8. A lumber marking machine comprising a support over which the lumber to be marked is moved one piece upon another, a marker in the path of the moving piece of lumber, a vertically moving carriage supporting said marker, and means for normally locking said carriage, mechanism actuated by the moving piece of lumber for releasing said carriage upon the completion of the marking operation, and means made operative by the moving piece of lumber for raising said carriage and marker to the next marking position.

9. A lumber marking machine comprising a support over which the lumber is moved one piece upon another, a marker and supporting carriage therefor, and means for locking said carriage, mechanism actuated by the moving piece of lumber when the marking operation is completed for releasing said carriage, a slide and springs connecting it with said carriage, and means mounted on said slide and having a surface for contact with the moving piece of lumber for raising said slide and thereafter lifting said carriage and marker when said carriage is released.

10. A lumber marking machine comprising a support over which the lumber is moved one piece upon another, an upright guide at one end of said support, a carriage slidable on said guide and means for normally locking it thereon, a marker mounted in said carriage, and having marking dies adapted for adjustment in the path of a piece of lumber on said support, and mechanism actuated by the pressure of a piece of lumber after contact with the die for releasing said carriage to allow it and said marker to be raised to a position for marking the second piece of lumber resting upon the first piece.

11. A lumber marking machine comprising a support over which the lumber is moved one piece upon another, an upright guide at one end of said support, a carriage mounted to slide vertically on said guide, an endless belt marker mounted in said carriage and having dies for contact with the lumber, means for locking said carriage on said guide, means for shifting said belt to present another marking die to the lumber, mechanism actuated by the pressure of the lumber on the die for releasing said carriage to allow it and said marker to be raised to another marking position, and means made operative by the movement of the piece of lumber for lifting said carriage and marker when released.

12. A lumber marking machine comprising a support over which the lumber is moved one piece upon another, an upright guide at one end of said support, a carriage slidable on said guide and having a locking means, a marker supported by said carriage for marking a piece of lumber moving thereto, a slide on said guide, springs connecting said slide with said carriage, a member connected with said slide and having a curved lower surface for contact with the moving piece of lumber, engagement of the lumber with said surface raising said slide and putting said springs under tension, and mechanism actuated by the piece of lumber being marked for releasing said carriage and allowing it to be raised to another marking position.

13. A lumber marking machine comprising a support over which the lumber is moved one piece upon another, an upright guide at one end of said support, a carriage slidable on said guide, a lumber marker supported by said carriage and having means for placing a mark on a surface of the approaching piece of lumber, a stop also movable on said guide with which the lumber contacts for alignment of the forward ends of the lumber, means for normally locking said carriage, mechanism actuated by pressure of a piece of lumber for releasing said locking means when the marking operation is completed, and means for raising said carriage and marker when released to adjust them for marking another piece of lumber resting upon the piece beneath.

14. A lumber grade marking machine comprising a support over which the lumber is moved one piece upon another, an upright guide at one end of said support, a carriage slidable thereon, a marking belt supported by said carriage and having dies thereon for contact with the lumber, mechanism for locking said carriage on said guide, mechanism for manually moving said belt to present a new die to its marking position, mechanism actuated by the pressure of a piece of lumber following the marking operation for releasing said carriage to allow it and said belt to move upwardly to another marking position, and mecahnism adapted to be operated at a point remote from said carriage for shifting said belt to present another marking die to the work.

15. A lumber grade marking machine comprising a support over which the lumber is moved one piece upon another, a carriage mounted at one end of said support, a marker supported by said carriage, manually operated means for adjusting said marker to present a new mark to the work, and mechanism adapted to be operated at a point remote from said marker for shifting it to present a new mark in the path of the lumber.

16. A lumber grade marking machine comprising a support over which the lumber is moved, a carriage mounted at one end of said support, an endless marking belt mounted in said carriage and having dies for contact with the approaching piece of lumber, mechanism including an oscillating rack for shifting said belt to present a new die to the path of the piece of lumber and mechanism adapted to be operated at a point remote from said marker for oscillating said rack and effecting the shifting operation of said belt.

17. A lumber grade marking machine comprising a support over which the lumber is moved, a marker in the path of the moving lumber and adapted for adjustment to mark each piece regardless of its length, width or thickness, and means for selectively applying the proper grade mark to a transverse vertical section of the successive pieces of lumber as they are fed and placed one upon the other.

18. A lumber grade marking machine comprising a support upon which the pieces of lumber are piled one upon another, a marker in the path of the lumber as it is moved upon said support, said marker being adapted to apply a grade mark to the transverse vertical end surfaces of each piece of lumber regardless of variations in their dimensions, and manually operated means for shifting said marker to present the proper mark to the piece of lumber to be graded.

19. A lumber marking machine comprising a support over which the lumber is moved, a marker, means for locking it in its marking position to apply a mark to a piece of lumber, and mechanism for releasing said marker when marking of the initial piece has been completed.

20. A lumber marking machine adapted to receive pieces of lumber delivered endwise thereto, a sliding marker and means for normally locking it in its marking position, and mechanism actuated by a moving piece of lumber for releasing said marker.

21. A lumber grade marking machine comprising a support over which the lumber is moved, a carriage mounted on said support, a marker supported by said carriage on a horizontal axis and manually operated means for adjusting said marker to present a new mark to the pieces of lumber as they are fed and piled one upon the other.

22. A lumber marking machine adapted to receive pieces of lumber piled one upon another, a marker mounted to apply a mark to an end surface of a piece of lumber in the pile, and means for moving said marker upon the delivery of each piece of lumber for successively marking each piece in the pile.

23. A lumber marking machine adapted to receive pieces of lumber fed endwise thereto, a carriage and a vertical guide whereon said carriage is movable for adjustment with respect to pieces of piled lumber, and means for normally locking said carriage, a marker supported in said carriage and adapted for selective adjustment in the path of a piece of lumber according to the grade thereof to apply a predetermined grade mark thereto.

24. A lumber marking machine adapted to receive pieces of lumber fed endwise thereto, a carriage and a guide whereon said carriage is movable, means for normally locking said carriage, a marker supported in said carriage and adapted for selective adjustment in the path of a piece of lumber to apply a predetermined grade mark thereto, and mechanism actuated by the pressure of a piece of lumber after marking for releasing said carriage to allow it and said marker to be adjusted for marking a second piece of lumber.

25. A lumber grade marking machine adapted to receive pieces of lumber to be graded delivered endwise thereto, a marker adapted to apply grade marks to transverse vertical surfaces of pieces of lumber of varying length, thickness and width, a plurality of die members adjustable on said marker and means controlled by a grading operator at a point where he can easily determine the proper grade, for shifting said die members for each piece of lumber, if necessary, as it impacts with the marker to consecutively apply the proper grade mark to the pieces of lumber.

26. A lumber grade marking machine comprising a support over which the lumber of varying lengths, thickness and width is moved, a marker in the path of the moving lumber, a plurality of die members thereon; means engaged by the moving lumber for positioning the marker to cause a die member to be engaged by the lumber as the successive pieces impact with the selected die member, and means remote from the marker and manually operable to adjust said die members to cause a selected die to be presented to a given piece of lumber, subsequent to and corresponding to the mental grading of the lumber by a grade-marking attendant.

27. A lumber grade marking machine comprising a support over which the lumber is moved, a marker in the path of the moving lumber for marking transverse vertical surfaces and provided with characters representing different grades of lumber, and mechanism adapted for operation at a point where the attendant can inspect the lumber for grading it and manually adjust said marker as he views each piece of lumber to apply the proper grade mark thereto, as it is fed into the marker and impacts with said characters.

28. A lumber marking machine comprising a support over which the lumber is moved, a marker and means for locking it in its marking position to apply a mark to the first piece of lumber and mechanism for releasing said marker and raising it to another locking position when the marking of the first piece has been completed.

29. A lumber marking machine comprising a support over which the lumber is moved longitudinally and on which it may be viewed by an attendant and mentally graded, a marking device provided with a series of symbols or characters indicating different grades of lumber, and with which the end of the lumber impacts, and mechanism controlled by an attendant from a viewing and grading position for adjusting said marker during the travel of the piece of lumber thereto for applying the desired grade mark to the surface of the lumber.

30. A lumber marking machine comprising a support over which the lumber is moved longitudinally and upon which the individual pieces of lumber may be viewed and mentally graded by an attendant, a grade marking device positioned to apply any one of a series of grade marks by impact to the surface of the lumber, and manually controlled means operated by the attendant as the pieces of lumber are moving toward the marker for adjusting said marker to position the desired grade mark for application to the surface of the approaching piece of lumber.

31. A lumber grade-marking machine comprising a support over which the lumber is moved, a marker including a plurality of different grade-marking dies adjustably mounted thereon and each adapted to be positioned in the path of the moving lumber, one at a time, and means manually operable by a grade-marking attendant, for selectively presenting one of said dies in the path of the lumber to receive its impact, subsequent to the mental grading of each piece of lumber by an attendant.

32. A lumber grade-marking machine comprising a support over which the lumber is moved, a marker including an endless belt, a plurality of different grade-marking dies secured to said belt and each adapted to be positioned in the path of the moving lumber, and means remote from the marker and manually operable by a grade-marking attendant for rotating said belt to selectively present one of said dies in the longitudinal path of the lumber to receive its impact, subsequent to the mental grading of each piece of lumber by the attendant.

33. A lumber grade-marking machine comprising a support over which the lumber is moved, a marking device including a movable member, a plurality of different grade marks on said member and each adapted to be positioned in the path of the moving lumber, and means having an operative connection with said movable member, whereby said means may be manually operated by a grade-marking attendant to adjust said grade marks to present a selected mark in the path of the moving lumber to receive its longitudinal impact, subsequent to and corresponding to the mental grading of the lumber by the attendant.

34. A lumber grade-marking machine comprising a support over which the pieces of lumber are moved, a marker in the path of the moving lumber for applying grade marks to transverse vertical surfaces thereof, when the lumber contacts therewith, a plurality of characters representing different grades of lumber adjustable on said marker, and manually operated means for shifting said characters to present a selected mark to the lumber, after each piece is viewed and mentally graded by an attendant during the feeding operation.

35. A lumber grade-marking machine, comprising a support over which the lumber is moved, a marker against which the lumber is moved longitudinally and adapted to impact with, said marker being adapted to be revolved to present different marks in their marking position, and mechanism adapted to be manually operated from a distance for revolving said marker to selectively present a new mark to the lumber without regard to its length or dimensions.

In witness whereof, I have hereunto set my hand this 10th day of August, 1923.

JOSEPH GILBERT McDONOUGH.